July 3, 1951        H. L. GORDON        2,558,841

GEAR BOX FOR PUMPS

Filed Feb. 11, 1949        2 Sheets-Sheet 1

Inventor

*Henry L. Gordon*

By

Cushman Darby Cushman

ATTORNEYS

July 3, 1951

H. L. GORDON 2,558,841

GEAR BOX FOR PUMPS

Filed Feb. 11, 1949

Inventor
Henry L. Gordon

By
Cushman Darby Cushman
ATTORNEYS

Patented July 3, 1951

2,558,841

UNITED STATES PATENT OFFICE 2,558,841

GEAR BOX FOR PUMPS

Henry L. Gordon, Delray Beach, Fla.

Application February 11, 1949, Serial No. 75,887

4 Claims. (Cl. 74—417)

The present invention relates to improvements in the construction and operation of gear boxes for irrigation pumps and the like.

An important object is to provide a gear box into which extends a drive shaft and an angularly disposed driven shaft that is axially displaceable and adjustable within the gear box. A transfer gear rotatably mounted on the driven shaft is operatively connected to the drive shaft and is arranged to be operatively connected to the driven shaft through the instrumentality of locking means releasably connected to the driven shaft, without interferring with the axial adjustment of the driven shaft relative to the gear box so that the length of the driven shaft extending into the gear box may be varied upon axial movement of the driven shaft to change the point of connection of the locking means therewith.

Other objects and advantages of the invention will become apparent from the following description when taken in conjunction with the accompanying claims and drawings.

Referring to the drawings in which is shown a preferred embodiment of the invention:

Figure 4 is a sectional view taken substantially along the line 4—4 of Figure 1.

Figure 1:
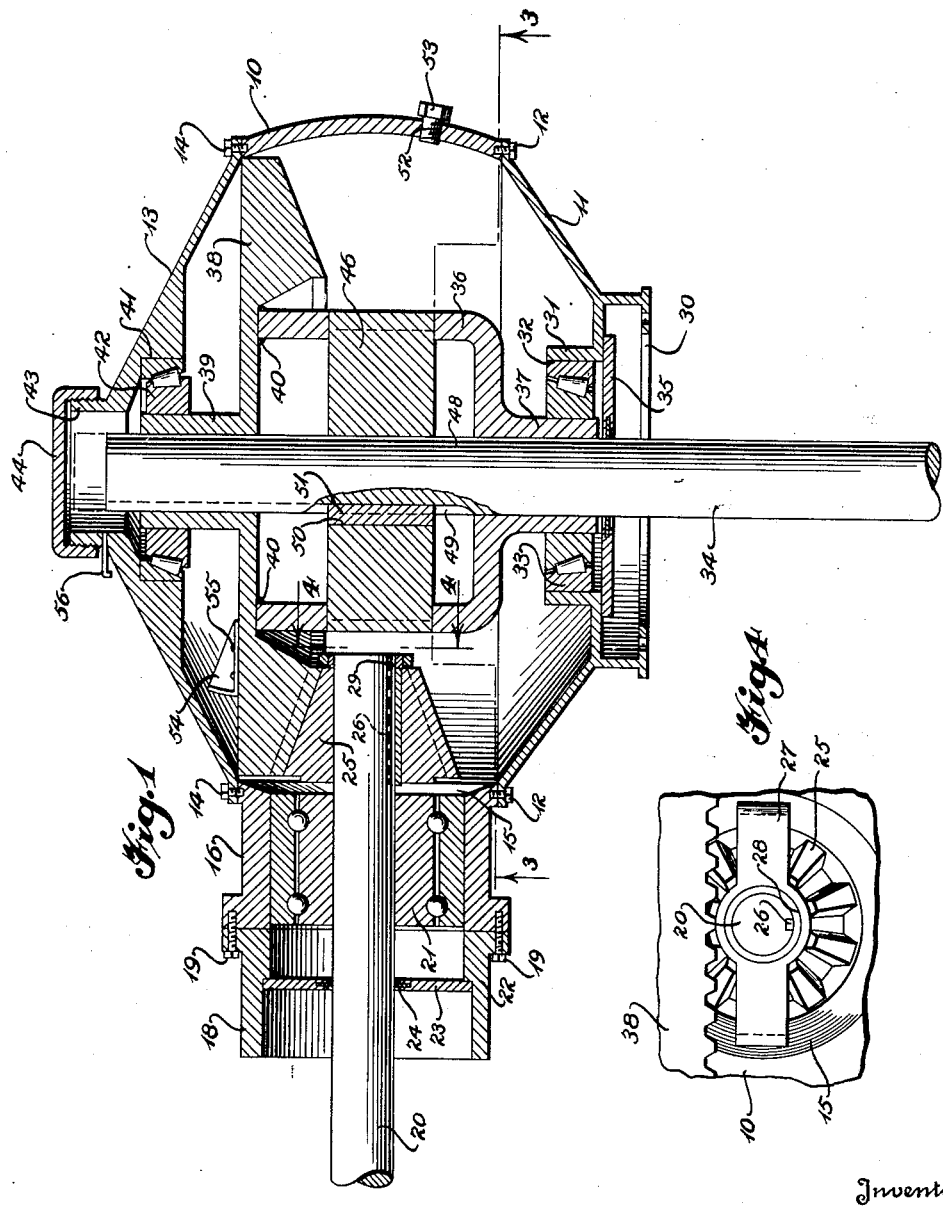
Figure 1 is a vertical section of my gear box taken substantially along the line 1—1 of Figure 2.
Figure 2:
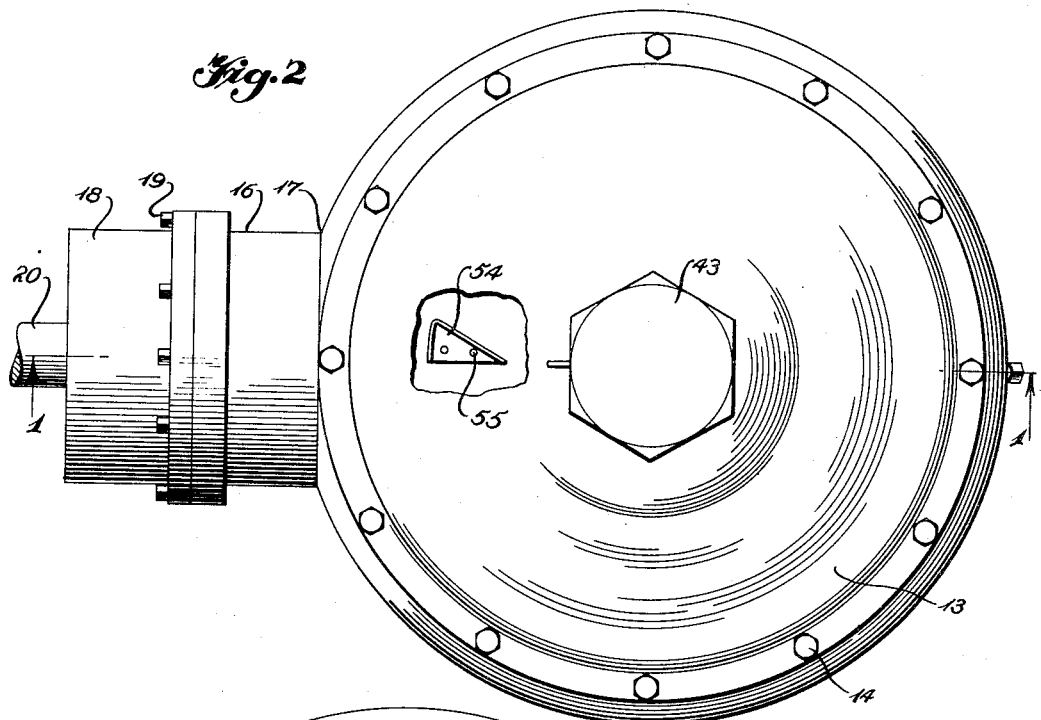
Figure 2 is a plan view of Figure 1.

Referring to the drawings in which like numerals designate like parts in the several views, 10 indicates a gear box casing of any suitable size and shape and which may have a detachable truncated shaped base 11 (Fig. 1) connected to the lower end of the casing by the circumferentially spaced threaded bolts 12. A truncated cover 13 may be similarly connected to the top of the casing 10 by the spaced threaded bolts 14. The casing 10 at one side thereof has a horizontal opening 15 which communicates with an outwardly extending sleeve 16 connected to the casing in any suitable manner as at 17, such as by welding or the like (Fig. 2). A tubular member 18 concentric with the sleeve 16 may be detachably connected to the outer end thereof by the spaced threaded bolts 19. A horizontal drive shaft 20 connected to a prime mover, such as a motor or the like, not shown, extends through the tubular member 18, sleeve 16 and openings 15 into the casing 10 and may be rotatably supported in the sleeve 16 by the ball bearing member 21. The tubular member 18 is provided with an enlarged inner shoulder 22 to which may be connected a disc or plate 23 having a central opening provided with flexible means 24 engaging the drive shaft 20 to form an oil or liquid seal therewith. The inner end portion of the drive shaft 20 extending into the casing 10 has mounted thereon a pinion 25 which is keyed as at 26 (Fig. 4) to the shaft 20 so as to be rotatable therewith. A U-shaped bar or brace member 27 connected to the inner wall of the casing 10, has a central opening 28 concentric with the opening 15 so as to rotatably receive and support as at 29 the adjacent inner end of the drive shaft 20.

The casing base 11 has a vertical end opening 30 and also has an inwardly extending annular reduced flange 31 that forms an opening 32 concentric with the opening 30. A ball bearing member 33 is mounted in the annular flange 31, and extending through the openings 31 and 32 is an axially displaceable driven shaft 34 that is operatively connected to an irrigation pump or the like, not shown. An oil seal disc 35, similar in construction to the disc 23, is connected to the casing base 11 adjacent the opening 32 and engages the driven shaft 34 so as to prevent oil or other lubricant in the casing 10 from escaping therefrom when the parts are assembled. A rotatable cylindrical housing 36 in the casing 10 has a depending sleeve 37 which engages the ball bearing member 33 and slidably receives the driven shaft 34. A transfer gear 38 has a sleeve 39 in vertical alignment with the sleeve 37 and through which the driven shaft 34 loosely or freely extends so as to be rotatably mounted thereon. The transfer gear may be welded or otherwise connected as at 40 to the housing 36 and meshes with the teeth of the pinion 25 so as to be rotated on the driven shaft 34 upon operation of the drive shaft 20. The casing cover 13 is provided with an enlarged annular shoulder 41 in which is mounted a ball bearing member 42 that rotatably engages the sleeve 39 of the transfer gear 38. The cover 13 may also have an externally threaded tubular end portion 43 closed by an internally threaded cap 44.

Figure 3:
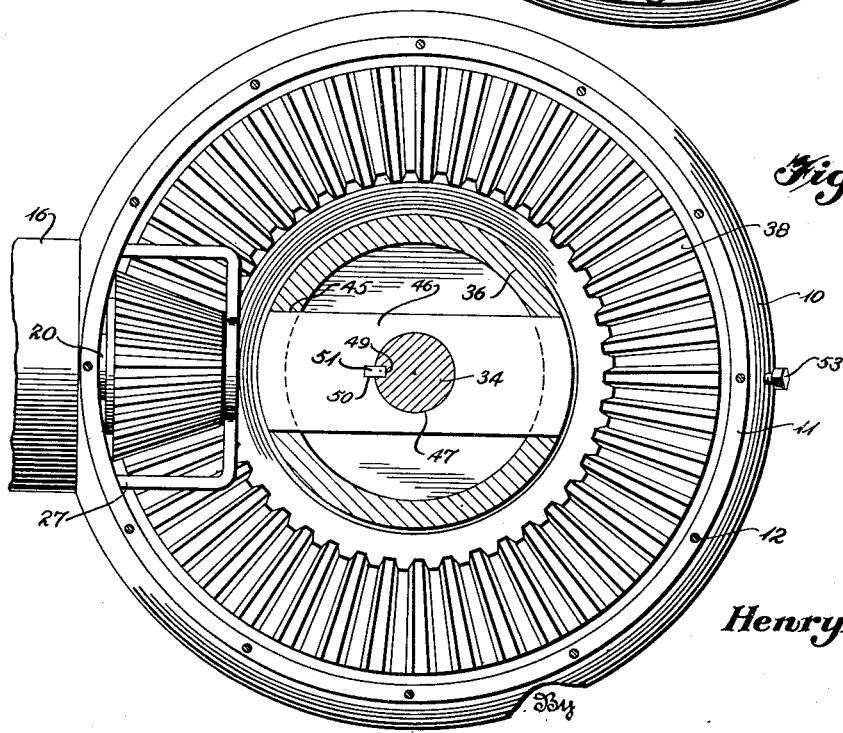
Figure 3 is a sectional view taken substantially along the line 3—3 of Figure 1.

The housing 36 is formed with diametrically disposed vertical slots 45 (Fig. 3) into which extends a transverse key block or member 46 so as to be rotatable therewith. The block 46 has a central vertical opening 47 for slidably and rotatably receiving the driven shaft 34. The upper portion 48 of the driven shaft 34 which projects into the casing 10, is provided with an elongated longitudinal groove or recess 49 in the side thereof that extends downwardly from its upper end a substantial distance, as shown in Figure 1, and registers with a vertical slot or groove 50 in the wall of the opening 47 to provide confronting recesses for receiving a removable locking key or pin 51 for rotatably connecting the driven shaft 34 to the housing 36 and the transfer gear 38 when the latter is rotated by the drive shaft 20. Thus, it will be seen that the driven shaft 34 rotates freely in the sleeve 39 of the transfer gear 38 but is locked to the housing 36 by the key 51 when it is desired to operatively connect the drive shaft 20 therewith. Moreover, the length of the shaft 34 extending into the casing 10 may be varied or adjusted by axial movement of the shaft 34 within the limits provided by the length of the groove 49, and this adjustment may be effected without interferring with the operative connection of the drive shaft 20 with the driven shaft. When the key 51 is removed, both the transfer gear 38 and the housing 36 are rotatable on the shaft 34.

In order to insure proper lubrication of the parts within the casing 10, oil may be introduced therein upon removal of the cap 44 from the tubular end portion 43 and the oil may be discharged from the housing through a drain opening 52 controlled by a threaded plug 53. To insure proper circulation of the oil within the casing 10, an oil baffle 54 may be mounted as at 55 to the top of the transfer gear 38. A breather pipe 56 may extend into the reduced portion 43 of the cover 13 to permit the introduction of outside air into the casing. As the spaced ball bearing members 33 and 42 rotatably support the portion 48 of the driven shaft 34 within the casing 10, it will be seen that no additional bearing members are required at a lower point on the shaft 34 to maintain the same in proper operative position, and that these bearing members guide and give ample support to the shaft at two suitably spaced points. The removable key 51 may be inserted when the gear box is assembled and is withdrawn after the driven shaft 34 is removed from the casing 10. The provision of the housing 36 and the key block 46 eliminates the use of additional bearings and expensive and cumbersome castings usually associated with gear boxes of this type.

Thus, it will be seen that the gear box casing 10 is provided with simple, efficient and positive means for operatively connecting the drive shaft 20 to the axially adjustable shaft 34, and that the shaft 34 can easily be replaced at a minimum expenditure of time and effort. Further, the length or height of the driven shaft 34 may be manually adjusted as the best operating conditions require by changing the point at which the shaft 34 is keyed by the pin 50 to the rotatable block 46 and the transfer gear 38.

It will be understood that the form of the invention shown is illustrative of a preferred embodiment and that such changes may be made as fall within the scope of the following claims.

I claim:

1. A gear box of the class described including a casing having a horizontal side opening and a vertical opening in one end thereof, a horizontal drive shaft extending through said side opening into the casing and having a pinion keyed on the inner end thereof, a vertical axially adjustable driven shaft extending through said end opening into the casing, a rotatable housing within said casing having a transfer gear meshing with said pinion, said housing and transfer gear having vertical openings aligning with the end opening of said casing, said driven shaft extending through the openings in said housing and said transfer gear and rotatably and axially movable relative thereto, and a removable locking means carried by the housing and engaging the driven shaft so as to cause rotation of the latter by the transfer gear when the drive shaft is rotated and without interferring with the axial adjustment of the driven shaft relative to the casing.

2. A gear box of the class described including a casing having a horizontal side opening and a vertical opening in one end thereof, a horizontal drive shaft extending through said side opening into the casing and having a pinion keyed on the inner end thereof, a vertical axially adjustable driven shaft extending through said end opening into the casing, a rotatable housing within said casing having a transfer gear meshing with said pinion, said housing and transfer gear having vertical openings aligning with the end opening of said casing, said driven shaft extending through the openings in said housing and said transfer gear and rotatably and axially movable relative thereto, said housing having diametrically opposed vertical slots, a transverse block mounted in said slots and having a central opening, the wall of said central opening having a vertical groove therein, said driven shaft extending through said central opening and provided with a confronting elongated longitudinal groove in the side thereof, and a removable key in said grooves for locking the driven shaft to the block so as to cause rotation of the driven shaft when the drive shaft and transfer gears are rotated and without interferring with the axial adjustment of the driven shaft relative to the casing.

3. A gear box of the class described including a casing having a horizontal side opening and a vertical opening in one end thereof, a horizontal drive shaft extending through said side opening into the casing and having a pinion keyed on the inner end thereof, a vertical axially adjustable driven shaft extending through said end opening into the casing, a rotatable housing within said casing having a transfer gear meshing with said pinion, said housing and transfer gear having vertical openings aligning with the end opening of said casing, said driven shaft extending through the openings in said housing and said transfer gear and rotatably and axially movable relative thereto, said housing having diametrically opposed vertical slots, a transverse block mounted in said slots and having a central opening, the wall of said central opening having a vertical groove therein, said driven shaft extending through said central opening and provided with a confronting elongated longitudinal groove in the side thereof, a removable key in said grooves for locking the driven shaft to the block so as to cause rotation of the driven shaft when the drive shaft and transfer gears are rotated and without interferring with the axial adjustment of the driven shaft relative to the casing, and vertically spaced ball bearing members rotatably mounted in the casing on opposite sides of said housing for guiding and maintaining the driven shaft in proper operative position within the housing.

4. A gear box of the class described including a casing having a horizontal side opening, a cover detachably connected to the casing and provided with a central through opening, a base detachably connected to the bottom of the casing and having a central opening in vertical alignment with the opening in said cover, ball bearing members rotatably mounted in the walls of said central openings, a rotatable housing having a depending sleeve extending through and in engagement with the ball bearing member in said base, a transfer gear fixed to the top of said housing and provided with an upwardly extending sleeve extending through the ball bearing member in said cover, a horizontal drive shaft extending through the side opening in said casing and having a pinion keyed on the inner end thereof and meshing with said transfer gear so as to rotate the latter, an axially adjustable driven shaft extending through the sleeves on the housing and the transfer gear so as to be rotatable and axially movable relative thereto, said driven shaft having an elongated longitudinal slot in the side thereof and extending from the upper end of the driven shaft downwardly into said housing, a transverse block rotatably connected to the housing and having a vertical groove confronting the groove in said driven shaft, and a removable key insertable in said grooves for locking the driven shaft to said housing so as to cause rotation of the driven shaft by the transfer gear when the drive shaft is rotated and without interferring with the axial adjustment of the driven shaft relative to the casing.

HENRY L. GORDON.

REFERENCES CITED

The following references are of record in the file of this patent:

UNITED STATES PATENTS

| Number | Name | Date |
|---|---|---|
| 1,051,619 | Mustin | Jan. 28, 1913 |
| 1,968,187 | White | July 31, 1934 |
| 2,277,331 | Kysor | Mar. 24, 1942 |
| 2,311,075 | O'Malley | Feb. 16, 1943 |

FOREIGN PATENTS

| Number | Country | Date |
|---|---|---|
| 1,015 | Austria | Mar. 10, 1900 |
| 442,101 | Germany | Mar. 22, 1927 |